United States Patent Office 3,687,790
Patented Aug. 29, 1972

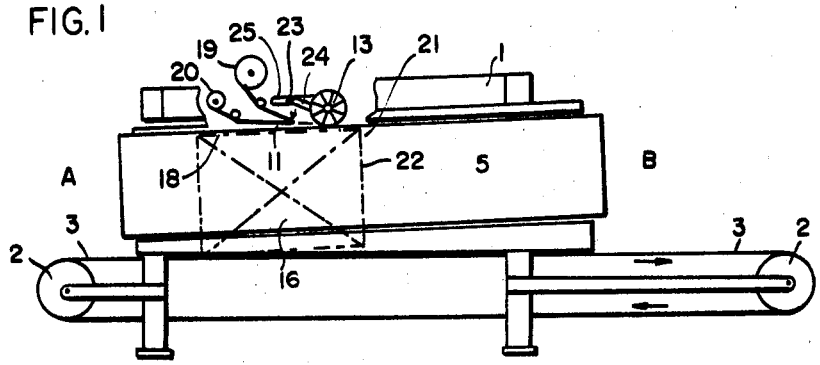
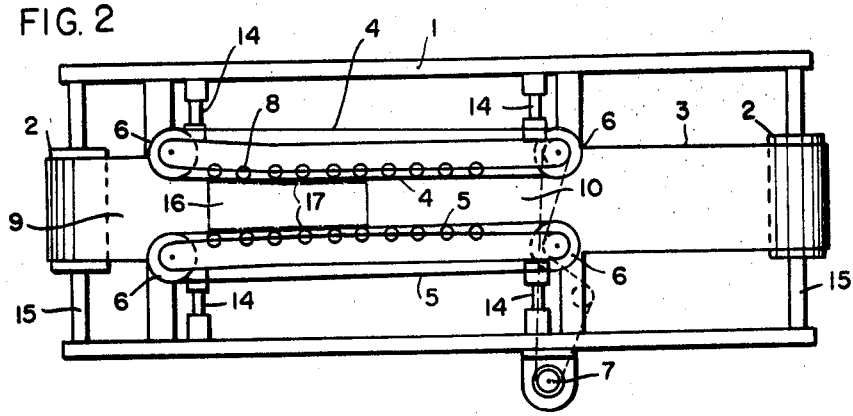
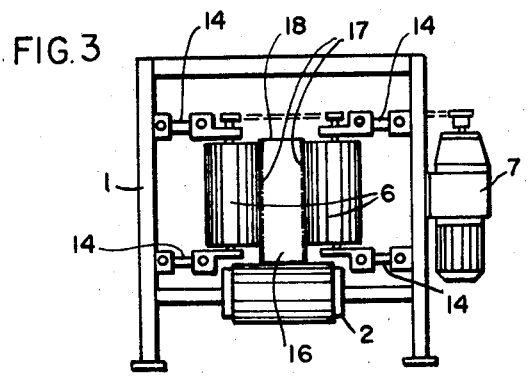

3,687,790
METHOD AND APPARATUS FOR PLATTENING, LABELING AND/OR SEALING FILLED SACKS, PARTICULARLY OF THE GUSSETED TYPE
Peter Wehren, 112a Breitendyk, 4150 Krefeld, Germany; Klaus Vollmer, 27 Gerionstrasse, 4060 Viersen, Germany; Wolfgang Guenther, 7 Huettenmuellerstrasse, 6700 Ludwigshafen, Germany; and Rolf Kick, 8 An den Weihergaerten, 6802 Ladenburg, Germany
Filed Apr. 1, 1970, Ser. No. 24,698
Claims priority, application Germany, Apr. 5, 1969, P 19 17 533.8
Int. Cl. B65c 3/26, 9/02
U.S. Cl. 156—540                        6 Claims

ABSTRACT OF THE DISCLOSURE

A method of flattening, labeling and/or sealing filled sacks by successively passing the sacks on end on conveying means to pressing elements moving in the same direction but at a greater speed than the sacks, causing the pressing elements to exert pressures on the two flat sides of the sack to evenly distribute and shape the sack contents, causing the sacks to be lifted from the conveying means during application of said pressures and to be labeled and/or sealed with adhesive tape and then causing the pressure forces to be removed and the sacks to be set down on the conveying means again.

---

This invention relates to a method and apparatus for flattening, labeling and/or sealing filled sacks, particularly of the gusseted type.

Modern high-speed filling lines for free-flowing bulk materials can handle from 1,000 to 1,500 sacks per hour. Such machines are preferably operated using sacks having automatically closing internal valves. The filled sacks are transported to the loading station by conveyors. During the transport on these conveyors the sacks exhibit very uneven shapes and irregular unstable side walls because the volume of the sacks is greater than that of the sack contents.

Hitherto, it has not been possible to label automatically such sacks having such yielding sides or to seal them automatically on their way to the loading station, since the pressing force applied by automatic labeling or sealing machines deforms the surface of the sacks unduly and it is not possible to produce the required pressing force. It has thus been necessary to label and seal the sacks by hand, which calls for additional manpower.

Since, moreover, automatically closing internal valves are never completely leak-proof and cannot be used at all for certain bulk materials, it has been necessary in some cases to use sacks having external valves which must be closed by hand. Using such sacks, a filler can fill only about half the number of sacks, whilst a further man is required to seal the external valves.

It is an object of the invention to provide a method and apparatus making it possible to give the filled sacks coming from the filling facility an even outer shape and to label them automatically and/or to close the mouths of the sacks with adhesive tape.

This object is achieved in accordance with the present invention by successively passing the sacks on end on conveying means to pressing elements moving in the same direction but at a greater speed than the sack conveying means, causing the pressing elements to exert pressures on the two flat sides of the sack to evenly distribute and shape the sack contents, causing the sacks to be lifted from the said conveying means during application of said pressures and to be labeled and/or sealed with adhesive tape and then causing the pressure forces to be removed from the sacks and the sacks to be set down on the said conveying means again.

The apparatus for carrying out this method is characterized in that conveying means for the sacks are mounted and driven in a supporting frame, two driven pressing elements are oppositely mounted above a section of said conveying means, which pressing elements form a vertical passageway having a tapered entry zone and are at an incline to the plane of the said conveying means, and a labeling and/or sealing device, composed of a label and/or adhesive tape dispenser and a press roll adapted to press periodically against the surface of the sacks as they move along said passageway, is located above the passageway. The pressing elements forming the walls of the passageway are, advantageously, inclined away from each other out of the vertical. The conveying means and pressing elements may be roller-guided endless conveyor belts.

The method of the invention is described below with reference to an apparatus according to the invention which is diagrammatically illustrated by way of example in the accompanying drawings.

FIG. 1 shows a side view of the flattening and labeling machine of the invention with the driving motor omitted.

FIG. 2 is a plan view of the apparatus of the invention including the driving motor.

FIG. 3 is a front view of the apparatus of the invention including the driving motor.

The apparatus shown in FIGS. 1 to 3 consists essentially of a supporting frame 1, conveying means 3 in the form of an endless conveyor belt guided and driven (by motor) by means of two rollers 2 horizontally mounted in the supporting frame 1 on axes 15, and two pressing elements 4 and 5, each consisting of an endless conveyor belt and each guided by two rollers 6 mounted vertically in the supporting frame 1 and each driven by an infinitely variable geared motor 7 attached to the supporting frame 1. The two pressing elements 4 and 5 in the form of conveyor belts are mounted vertically and oppositely above a section of the conveying means 3. Those portions of the pressing elements 4 and 5 which face each other are guided over backing rollers 8 vertically mounted in the supporting frame 1 and form a passageway 10 which has a tapered entry zone 9. The pressing elements 4 and 5 are at an incline to the plane of the conveying means and may, if necessary, be set out of vertical by means of set screws 14 so as to incline towards or away from each other forming, for example, a passageway 10 which is wider at the top than at the bottom. Above the passageway 10 there is a sticker unit consisting of a label and/or adhesive tape dispenser 11 and a press roll 13, which unit is again mounted in the supporting frame 1, its rotating and swinging parts being driven by motor.

For simplicity of illustration, the driving motor 7 has been omitted from FIG. 1 and the sticker unit from FIGS. 2 and 3.

Sacks 16 coming from a filling facility (not shown) are transported by the conveying means 3 to side A of the sack flattening apparatus, where they are gripped by the conveyor belt pressing elements and conveyed through the entry zone 9 to the passageway 10. The speed of the moving pressing elements 4 and 5 is set so as to be greater than that of the conveying means 3 to enable the sacks 16 to be drawn into the flattening machine without creasing. Due to the inclined relationship of the pressing elements 4 and 5 to the plane of the conveying means 3 the filled sacks 16 are lifted from the conveying means 3 as they pass into the passageway 10 and are transported through the passageway 10 by the pressing elements 4 and 5 only. Lifting of the sacks 16 from the conveying means 3 may be assisted by causing the pressing elements 4 and 5 to be inclined away from each other out of vertical by means of the set-screws 14 such that the passageway 10 is wider at the top than at the bottom.

As the sack 16 passes along the passageway 10 pressure forces are applied to the opposing flat side 17 of the sack 16 by the pressing elements 4 and 5 backed by the rollers 8. This forces the sack into a box shape and presses the bulk material contained in the sack against the sack walls all around. This operation results in smooth firm walls of the sack 16 and the pressure applied by the label and/or tape dispenser 11 and the press roll 13 cannot deform such walls to a substantial extent. The sack 16, still under the pressures applied by the pressing elements 4 and 5, is now passed under the sticker unit and, triggered by a contact actuated by the sack, the label dispenser 11 dispenses a gummed label on the narrow side 18 of the sack 16 facing the sticker unit and this label is secured in place by the press roll 13. The labels may be fed to the label dispenser, for example, on a backing film from a supply reel 19, the labels being discharged from the backing film in the label dispenser when the film passes over a sharp edge such that the label lands on the narrow side 18 of the sack 16. The used backing film is then wound on to the reel 20 and removed when the last label has been dispensed. The labeled sack 16 is finally relieved of the pressure forces, set down on the conveying means 3 and transported away from the flattening machine on side B.

The apparatus of the invention may also be used for sealing the mouths of valve sacks by means of adhesive tape. To this end the sack 16 is fed to the passageway 10 with its edge 21, which is the edge next to the internal valve, at the top and in front. The adhesive tape is removed from the supply reel 19 in the same manner as described for the labeling operation, is applied to the edge 21 of the sack and pressed firm by the press roll 13 on each side of the sack and pressed firm by the press roll 13 on each side of the edge 21 to adhere to those parts of the narrow sides 18 and 22 of the sack 16 which are adjacent to the edge 21. The pivot point 23 of the lever 24 of the press roll 13 must be shifted in the slot 25, provided in the supporting frame 1, to such an extent toward side B of the flattening apparatus that the press roll 13 can hang down into the passageway 10 far enough to be able to press the adhesive tape firmly against the part of the narrow side 22 of the sack 16 which is adjacent to the edge 21.

Where it is desirable to provide the sack 16 with both a label and a sealing strip to seal the mouth of the sack, these may both be included in one long adhesive tape or, alternatively, two sticker units must be provided above the passageway 10, one in advance of the other, each unit comprising a dispenser for labels or sealing strips, as the case may be, and a press roll.

The advantage gained from the method of the invention for labeling and sealing filled sacks is, in particular, that it permits the use of automatic labeling and sealing units and thus allows these operations to be carried out at a rate and degree of precision suited to the high output of modern filling stations for free-flowing bulk materials.

We claim:

1. A process for shaping filled sacks and applying an adhesive label or tape thereon which comprises advancing said filled sacks on end in succession on conveying means, bringing pressing elements into pressure exerting contact with opposite flat sides of said sacks to evenly distribute and shape the sack contents, moving said elements in the same direction as, but at a greater speed than the speed of said conveying means, lifting said sacks from said conveying means during the pressure exerting contact by said pressing elements, applying on said sacks, while said sacks are so-lifted, an adhesive label or tape, and thereafter releasing said sacks from said pressing elements and returning them to said conveying means.

2. A process as claimed in claim 1, said sacks having an inlet opening, and sealing said opening with said adhesive tape.

3. Apparatus for shaping filled sacks and applying an adhesive label or tape thereon, which comprises a frame, power driven, sack-supporting conveyor means on said frame, two power driven, oppositely disposed, substantially vertical, horizontally spaced, sack-pressing elements above a section of said conveyor means, said elements together forming therebetween a passageway with a tapered entry zone, said passageway being inclined relative to the plane of said conveyor means whereby said sacks, upon entering said passageway, are pressed on opposite flat sides thereof by said elements and are lifted off said conveyor means and whereby the contents of the sacks are shaped by the pressure of said elements, and adhesive label or tape-applying means associated with said elements for applying an adhesive label or tape on respective sacks while they are lifted off said conveyor means by said elements.

4. Apparatus as claimed in claim 3 wherein said pressing elements comprise a pair of horizontally spaced conveyor belts having opposing belt segments defining said passageway and moving in the direction of said conveyor means.

5. Apparatus as claimed in claim 4, and means mounting said belts with said belt segments moving in a path which is inclined relative to the plane of said conveyor means.

6. Apparatus as claimed in claim 4, said belt segments flaring outwardly in the vertical direction to provide a narrower dimension of said passageway at the bottom thereof than at the top thereof.

References Cited

UNITED STATES PATENTS

| | | | |
|---|---|---|---|
| 3,427,214 | 2/1969 | Voigt | 156—542 X |
| 3,200,029 | 8/1965 | Cross | 156—542 X |
| 3,159,266 | 12/1964 | Rapparlie | 198—165 X |
| 2,920,780 | 1/1960 | Hauschild et al. | 156—542 X |
| 3,022,912 | 2/1962 | Vincent | 198—165 X |
| 3,000,163 | 9/1961 | Bellamy | 53—387 |
| 2,266,054 | 12/1941 | Lowey et al. | 93—6 |

BENJAMIN A. BORCHELT, Primary Examiner

J. M. HANLEY, Assistant Examiner

U.S. Cl. X.R.

53—137; 156—361

PO-1050
(5/69)

UNITED STATES PATENT OFFICE
CERTIFICATE OF CORRECTION

Patent No. 3,687,790                    Dated August 29, 1972

Inventor(s) Wehren et al

It is certified that error appears in the above-identified patent and that said Letters Patent are hereby corrected as shown below:

Column 1, after line 8 insert -- assignors to Badische-Anilin-& Soda-Fabrik Aktiengesellschaft Ludwigshafen am Rhein, Germany --

Signed and sealed this 3rd day of April 1973.

(SEAL)
Attest:

EDWARD M. FLETCHER, JR.            ROBERT GOTTSCHALK
Attesting Officer                  Commissioner of Patents